March 26, 1940.    E. K. CLARK ET AL    2,195,001
THERMOSTAT
Filed Nov. 12, 1938
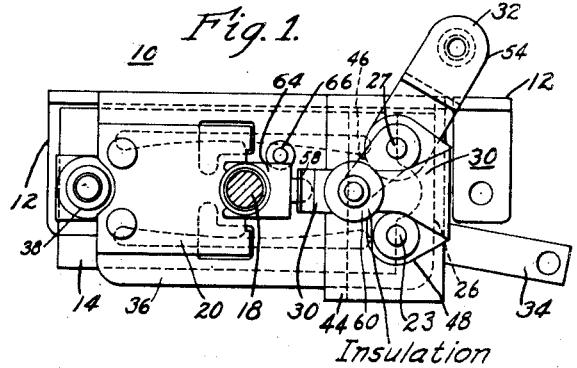
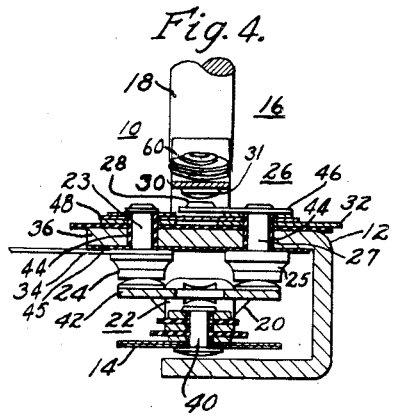
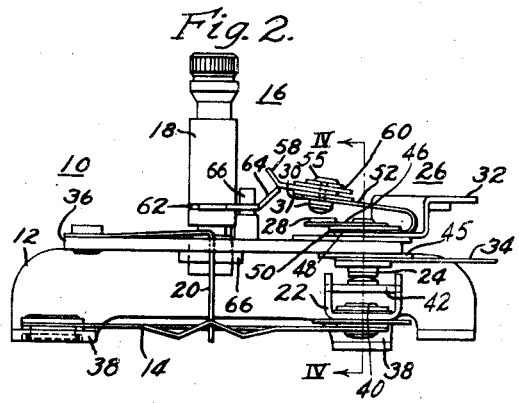
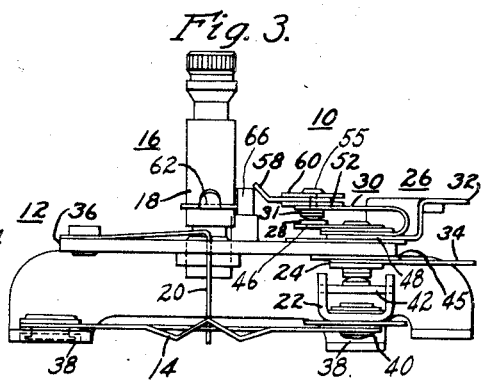
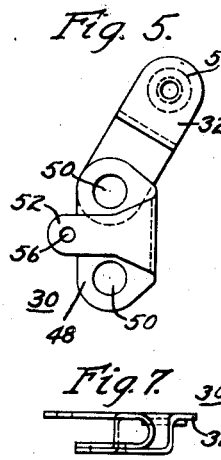
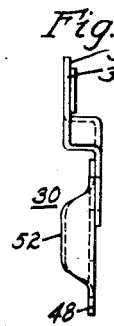
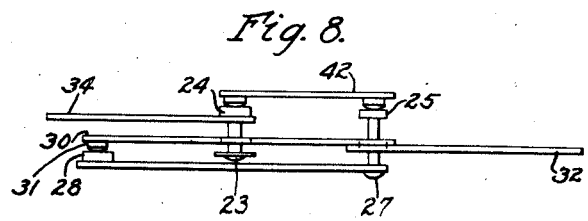
WITNESSES:
Leon M. Garman
H. G. Hepler
INVENTORS
Earl K. Clark and
Joseph S. Wojcik.
BY
W. R. Coley
ATTORNEY Patented Mar. 26, 1940

2,195,001

UNITED STATES PATENT OFFICE 2,195,001

THERMOSTAT

Earl K. Clark and Joseph S. Wojcik, Mansfield, Ohio, assignors to Westinghouse Electric & Manufacturing Company, East Pittsburgh, Pa., a corporation of Pennsylvania Application November 12, 1938, Serial No. 240,040

5 Claims. (Cl. 200—138)

Our invention relates to thermostatic devices, more particularly to a bimetallic thermostat having a circuit interrupting device incorporated therewith, and constitutes an improvement over the invention set forth in a copending application of E. K. Clark, Serial No. 241,767, filed November 22, 1938, which is a division of a copending application of E. K. Clark, Serial No. 81,052, filed May 21, 1936.

An object of our invention is to provide a thermostat having an auxiliary circuit-controlling device for disconnecting the thermostat from an associated circuit.

A further object of our invention is to provide a bimetallic thermostat having a disconnect switch intimately associated therewith and a controlling device or adjusting means for the thermostat which will disengage the switch when the thermostatic member is adjusted to an extreme, preferably its lowest, operating position.

A still further object of our invention is to provide a thermostat with a circuit interrupter having a stationary and a movable contact rigidly attached to and partially insulated from the thermostatic contacts.

Another object of our invention is to provide an efficient, rugged, inexpensive thermostat including a simultaneously operated circuit interrupter electrically associated with the thermostatically controlled contacts.

Other objects of our invention will either be pointed out specifically in the course of the following description of a device embodying our invention, or will be apparent from such description.

In the accompanying drawing:

Figure 1 is a top plan view of a device embodying our invention;

Figs. 2 and 3 are side elevational views of the device shown in Fig. 1 in inoperative and operative positions, respectively;

Fig. 4 is an enlarged sectional view taken along the line IV—IV of Fig. 2;

Figs. 5, 6 and 7 are top plan, side elevational and end views, respectively, of a portion of the device embodying our invention, and Fig. 8 is a diagrammatic sketch illustrating the electrical circuit through the device embodying our invention.

Referring to the accompanying drawing, we show a thermostat 10 including a supporting structure or base 12, a bimetallic member 14, adjusting means 16 including a shaft 18 and resilient member 20 operatively associated with the supporting structure 12 and bimetallic member 14, thermostatically operated contact means including a movable contact device 22 attached to the bimetallic member 14 and stationary contacts 24 and 25 attached to the structure 12, and an independently operated circuit-interrupter 26 comprising a stationary contact 28 and a resiliently movable contact member 30 operatively associated with the control shaft 18 and stationary contact 28.

The supporting structure or base 12 is, in this instance, formed as a unitary member with an outwardly extending supporting ledge 36, in the upper portion thereof. In addition to the upwardly disposed outwardly extending ledge 36, the base 12 has a plurality of outwardly extending feet or ledge portions 38 to permit the supporting structure or base 12 to be attached to an additional supporting member, such as the sole plate of a flatiron, or the like. The bimetallic member 14 is, in this instance, an elongated strip type member which is rigidly attached to the supporting base 12 at one end thereof. The bimetallic member 14 is thus adapted to flex from an operative position to an inoperative position and to actuate the contact means or movable contact device 22, rigidly attached thereto. An adjusting means 16, including a shaft 18 threadedly engaged with the upper ledge 36, is operatively associated with an irregularly shaped resilient member 20 which, in turn, is directly associated with the bimetallic member 14, to provide means for adjusting the operation of such member.

The movable contact device 22 is rigidly attached to the free end of bimetallic member 14 by a suitable rivet 40 and moves therewith in accordance with the temperature variation of the bimetallic member 14. The device 22 includes a horizontally disposed rocking contact arm or plate 42 which shunts across or electrically connects the stationary contacts 24 and 25 as the bimetallic member 14 flexes to a closed or operative position.

The thermostat comprising the supporting structure 12, bimetallic member 14, adjusting means 16 including the resilient member 20 and movable contact device 22, and the operation thereof, is more fully described and claimed in the copending application of E. K. Clark, Serial No. 237,270, filed October 27, 1938.

The stationary contacts 24 and 25, operatively associated with the rocking contact plate 42 of movable thermostatically controlled contact device 22 are insulatedly attached to the supporting ledge 36 and to suitable terminals 32 and

34 as will be hereinafter more fully described. The contacts 24 and 25 have upwardly extending rivet portions 23 and 27, respectively, which extend through the supporting ledge 36 and the resiliently movable contact members 30, and are insulated therefrom by means of suitable insulating members 44 (see Fig. 4). The upper ends of the contacts 24 and 25, after being insulatedly positioned through the ledge 36 and contact member 30 of the circuit interrupter 26, are riveted or spun over to form a rigid connection therebetween. The contact 24 is directly connected to the terminal 34 and the contact 25 is electrically insulated from the movable contact member 30 but is rigidly attached to the stationary contact 28 of the independently operated circuit-interrupter 26. A series circuit is thus established through the thermostatically controlled contact means and circuit interrupter 26, as hereinafter described.

The circuit interrupter 26 comprises a stationary contact 28 which is rigidly attached to the end of a finger 46 which, in turn, is rigidly attached to the upper end of the stationary contact 25, and, therefore, rigidly attached to the supporting structure or base 12. The contact 28 located on the free end of the finger 46 is thus positioned substantially along the longitudinal axis of the thermostat 10 and spaced between the axes of stationary contacts 24 and 25. The contact 28 cooperates mechanically and electrically with the movable contact member 30 in a manner hereinafter described to form the circuit-interrupter 26.

The resiliently movable contact member 30 of circuit interrupter 26 is preferably formed of an electrically conducting resilient material and has substantially a U-shaped longitudinal cross-section (see Figs. 2, 3 and 7). The member 30 has a base or supporting portion 48 which, in turn, has a plurality of apertures 50 to permit the member to be rigidly attached to the supporting structure 12. The member 30 is formed of substantially a triangular shaped member with the upper or vertex end thereof bent back over and somewhat upwardly displaced from the base portion thereof (see Fig. 5). The upper or vertex portion 52 of the movable contact member 30 is thus positioned above the supporting portion 48 of the contact member. An aperture 56 is positioned within the end of the vertex portion 52 whereby the member 30 is adapted to support a movable contact 31 and a tongue 58 (see Fig. 2), as hereinafter described. The movable contact 31, supported or rigidly attached to the vertex portion 52 of the movable contact member 30, is thus free to move vertically above the stationary contact 28 and to cooperate therewith, permitting passage of current through the resiliently movable contact member 30 in a manner hereinafter described.

A terminal strap 32 is, in this instance, rigidly attached to, and is a part of, the movable contact member 30. The terminal 32 has an upwardly extending offset end portion 54 which is formed therein to permit the thermostat to be more readily associated with say, a flatiron.

The thermostat is assembled with the movable contact member 30 positioned upon the supporting ledge 36 of support or base 12 with the apertures 50 located about the upwardly extending portions 23 and 27 of the stationary contacts 24 and 25. The contacts 24 and 25 are insulated from the ledge 36 and contact member 30 by means of suitable insulating sleeves 44 and strip 45. Additional insulating washers are also positioned about the base portion 48 of the movable contact member 30 to insulate it from the ledge 36 and to permit the finger 46 and terminal 34 to be positioned thereon and rigidly attached thereto. The upper ends of the upwardly extending portions 23 and 27 of contacts 24 and 25, respectively, are then riveted or spun over to form a rigid connection between the contact member 30 and the support or base 12. However, the terminal strap 34 is positioned in contact with contact 24 before the portion 23 is spun over, and the finger 46 is positioned in contact with portion 27 before it is spun over. The independently operated circuit interrupter 26 is thus rigidly attached to the supporting structure 12 by means of the stationary thermostatically operated contacts 24 and 25 while being insulated therefrom.

The movable contact 31 of the circuit interrupter 26 has an upwardly-extending rivet portion 55 which extends through the aperture 56 in the free end of the vertex portion 52 of the contact member 30. A protruding tongue member 58 is positioned about the rivet portion 55 and is insulated from the contact member 30 and the contact 31 by suitable insulating washers 60. The upper end of the rivet portion 55 is spun or pressed over to rigidly attach such member and the movable contact 31 to the free end of the contact member 30. It, therefore, follows that the tongue member 58 will move in unison with the upper or vertex portion 52 of the contact member 30.

The tongue portion 58 is adapted to cooperate with the adjusting means 16 to afford means for disengaging the circuit interrupter 26 when the bimetallic member 14 is adjusted to its lowest operating position as hereinafter described. The shaft 18 has an annular notch 62 cut therein intermediate the ends thereof, and a suitable bent lug 64 is operatively associated with the shaft 18 within the notch 62. The lug 64 has a press fit with the shaft 18 within the notch 62 to prevent any movement therebetween. A suitable stop member 66 is positioned on the supporting ledge 36 to cooperate with the lug 64 to limit the rotation of the adjusting means 16.

The lug 64 has an upwardly extending end portion to cooperate with the tongue member 58 insulatedly attached to the free end of the contact member 30. The cooperative action between the lug 64 and the tongue 58 ensures the positive action of the circuit interrupter 26 when the control shaft 18 is rotated about its axis so that the upwardly extending end portion of the lug 64 will contact the tongue 58. It, therefore, follows that as the adjusting means or control shaft 18 is rotated about its vertical axis so as to adjust the operating range of the bimetallic member 14 in a manner as described in the copending application of E. K. Clark, Serial No. 237,270, filed October 27, 1939, the lug 64 will contact underneath the tongue 58 only when the bimetallic member 14 is adjusted to its lowest operating position. The cooperation between the lug 64 and tongue 58 will then disengage the circuit interrupter 26 and disconnect the thermostat from a power supply (not shown).

Referring to Figs. 4 and 8, it will be observed that the electrical circuit through the thermostat will be substantially as follows: From terminal 32 which is, in this instance, a portion of the contact member 30, contact member 30, movable contact 31, stationary contact 28, stationary contact 25 of the thermostatically operated contact means, rockable contact plate 42 of the movable contact device 22, stationary contact 24 of the thermostatically operated contact means and the terminal 34. It therefore follows that the bimetallic member 14 and operatively associated thermostatically operated contact means 22 may be in their closed or operated position due to the ambient temperature thereof without having current passing through the thermostat. This condition will prevail only when the adjusting means 16 is rotated to its lowest operating position or when the lug 64 is operatively engaged with the tongue 58.

In operating the thermostat embodying our invention, such thermostat is positioned in thermal communication with the device, such as a flatiron, which is desired to be controlled (not shown) and the terminals 32 and 34 are operably connected through the device to the power supply thereto (not shown). Assuming that the thermostat is in its closed or operated position as shown in Fig. 3, power will pass through the thermostat by means of the thermostatically controlled contact means 22 and independently operated circuit interrupter 26. The bimetallic member 14 will then flex from an open to a closed position depending upon the temperature thereof and of the controlled device. However, for any of the operating settings of the thermostat, the independently operated circuit interrupter 26 will remain in a closed position as shown in Fig. 3. In other words, the thermostat will operate purely on the thermally operated basis in response to the temperature of bimetallic member 14.

Should it be desired to disconnect the operating device from the power supply, or to adjust the thermostat to its lowest position, the adjusting shaft 18 of adjusting means 16 is rotated say in a counter-clockwise direction, so that the lug 64 will contact the tongue 58 and with a continued rotation of the shaft 18 will force such tongue 58 upwardly. The vertex portion 52 of the movable contact member 30 will thus be raised. Likewise, the movable contact 31 will be separated from the stationary contact 28. This cooperative action between the control or adjusting means and the contact member will take place regardless of the relative positions of the thermostatically operated contact means 22. Passage of current will thus be stopped and the controlled device will accordingly be disconnected from the power supply.

It, therefore, follows that the device embodying our invention provides a thermostat incorporating an independently operated circuit interrupter which is an inherent part of the thermostat and which functions in association therewith.

It is further obvious that, due to the proper positioning of lug 64 upon control shaft 18, the circuit interrupter 26 will only be actuated or disengaged when the bimetallic member 14 is adjusted to its lowest operating position.

Various modifications may be made in the device embodying our invention without departing from the spirit and scope thereof, and we desire, therefore, that only such limitations shall be placed thereon as are imposed by the prior art and the appended claims.

We claim as our invention:

1. A thermostat comprising, in combination, a support, a bimetallic member attached to the support, contact means, means for adjusting the member to disengage the contact means at predetermined temperatures, and a circuit controlling device actuated by a predetermined operation of the adjusting means, said circuit controlling device including a movable contact resiliently attached to the support.

2. A thermostat comprising, in combination, a support, a bimetallic member attached to the support, contact means, means comprising a shaft attached to the support for adjusting the member to disengage the contact means at predetermined temperatures, a protruding member associated with the shaft, and a circuit controlling device actuated by the protruding member by a predetermined operation of the adjusting means, said circuit controlling device including a movable contact resiliently attached to the support.

3. A thermostat comprising, in combination, a support, a bimetallic member attached to the support, contact means including a stationary contact attached to the support, means for adjusting the member to disengage the contact means at predetermined temperatures, and a circuit controlling device actuated by a predetermined operation of the adjusting means, said circuit controlling device including a movable contract resiliently attached to and insulated from the stationary contact.

4. A thermostat comprising in combination a supporting structure, a bimetallic member attached to such structure, contact means operatively associated with such member, independently actuated contact means including a stationary contact directly associated with the first contact means and a movable contact resiliently attached to the support, and means comprising a control member attached to the support for adjusting the bimetallic member to disengage the first contact means at predetermined temperatures and for disengaging the second contact when the bimetallic member is adjusted to an extreme operating position.

5. A thermostat comprising, in combination, a supporting structure, a bimetallic member, contact means including a movable contact attached to the bimetallic member and a stationary contact attached to the support, a control member attached to the structure and operatively associated with the bimetallic member for adjusting the member to disengage the contact means at predetermined temperatures, a circuit controlling device including a stationary contact and a movable contact member attached to the structure, said movable contact member having substantially a U-shaped longitudinal cross-section, and a protruding member attached to the control member and associated with the U-shaped movable contact member for disengaging the circuit controlling device when the bimetallic member is adjusted to its lowest operating position.

EARL K. CLARK.
JOSEPH S. WOJCIK.